Patented Mar. 24, 1936

2,035,140

UNITED STATES PATENT OFFICE 2,035,140

COMPOSITION FOR MAKING DENTAL FILLINGS

Eugen Brill, Berlin, Germany

No Drawing. Application September 26, 1934, Serial No. 745,525. In Germany September 28, 1933

2 Claims. (Cl. 106—6)

This invention relates to dental fillings and more particularly to a composition for making dental fillings being transparent and corresponding to the known silicate cements, and a method of producing said composition.

Of the known compositions for making resistant and durable dental fillings the zinc phosphate cements have the disadvantage that their appearance is chalky and dead. Furthermore they are not very resistant against chemical and mechanical influences and are comparatively readily soluble. Their great advantage over other materials is that they represent neutral compounds and, therefore, do not affect the pulps of the teeth.

On the other hand, the silicate cements generally composed of aluminum oxide, calcium oxide, and silicic acid, wherein the aluminum oxide may be partly replaced by beryllium oxide or the oxides of the rare earths, are distinguished from the above mentioned zinc phosphate cements by their high transparency and resistance against chemical and mechanical influences. Their great disadvantage consists in the fact that they very readily split off acid and, thus, injuriously affect the pulp. Therefore, in general it is necessary first to apply a layer of zinc phosphate, lacquer, or the like to the cavity, said layer separating the silicate cement filling from the pulp. But this measure does not always suffice, to prevent injuries to the pulp completely. A further very serious disadvantage of dental fillings made by means of these products is their tendency to shrink within a certain period; hence, no permanently close connection between the edge of the cavity and the edge of the filling is obtained.

Now, it has been found that the above mentioned disadvantages of both types of cements, of the zinc phosphate and the silicate cements, may be very readily overcome by adding lithium in any desired form to a normal porcelain-like silicate cement. For carrying out the invention, one may, for instance, add lithium carbonate or lithium oxide or other lithium compounds capable of yielding the oxide in amounts of more than 4 per cent and up to about 25 per cent calculated as lithium oxide to the cement while fusing the same. Or the finished cement after its fusion may be mixed with suitable lithium compounds, such as lithium aluminate, lithium silicate, lithium oxide or the like. One may also add the lithium compounds, such as lithium phosphate, lithium carbonate, or the like, to the binding liquid. Thus, it is possible to produce cements which do not contain calcium compounds and which, therefore, do not show the disadvantages caused by the presence of the latter.

The following examples serve to illustrate the invention without, however, limiting the same to them.

Example 1

| | Parts |
|---|---|
| Aluminum oxide | 30 |
| Lithium carbonate | 15 |
| Feldspar | 15 |
| Sand | 33 |
| Zinc oxide | 5 | are intimately ground together to a fine powder, which is fused at about 1300° C. After cooling, the fused mass is pulverized. The powder obtained represents the cement which on mixing with the customary binding liquid, such as a mixture of ortho-, pyro- and metaphosphoric acid, is used as a dental filling of excellent properties.

One may proceed in such a manner, that the lithium carbonate is added slowly to the fused mass of aluminum oxide, feldspar, sand, and zinc oxide. Other lithium compounds, such as the oxide, the nitrate, or the like, may also be used. Furthermore one may first produce from a solution of the components or by fusion a lithium aluminate which is then added to the fused mass. Or first a frit of aluminum oxide, feldspar and sand may be produced which, after cooling and pulverizing, may be mixed with a finely pulverized lithium aluminate, or lithium silicate, or a lithium aluminum silicate, or the like.

Of course, the above given amounts of aluminum oxide, feldspar, sand and the like may be varied according to the requirements. Thus, for instance, instead of the zinc oxide, magnesium oxide or carbonate may be used. The aluminum may be partly, even to more than half its amount, replaced by zinc compounds. Also a fluoride or another flux may be added in order to lower the fusing point of the composition. A suitable fluoride is cryolite. The addition of rare earths and the like, under certain conditions, may also be of advantage.

The materials used have to be as pure as possible in order to avoid discolorations. The mass itself is colored in the customary manner by the addition of metal oxides to the fused mass or by mixing the frit with metal silicates. The composition may also be diluted by the addition of feldspar or aluminum oxide or the like, which may be added either to the fused mass or to the solidified frit. By these means the setting time of the cement may be readily regulated and adapted to requirements. The amount of lithium oxide in the cement powder may be one third of the entire mass or even more, but is advantageously between 10 to 20 per cent of the same.

*Example 2*

To 10 parts of a customary binding liquid, consisting for instance of about

| | Parts |
|---|---|
| Phosphoric acid | 50 |
| Zinc phosphate | 5 |
| Aluminum phosphate | 3 |

1 part of lithium phosphate is added, preferably while heating, until the lithium phosphate is dissolved. The cooled solution on mixing with a silicate cement corresponding to a soft porcelain mass and obtained by fusing 30 to 50 parts of aluminum oxide, 10 to 20 parts of feldspar, 25 to 40 parts of sand, and 1 to 10 parts of other components, such as zinc oxide, magnesium oxide, beryllium oxide, fluor spar, or the like, yields a dental filling which may be worked very readily, which after setting and hardening, possesses a high chemical and mechanical resistance and stability of volume, and which does not exert any irritating effect upon the pulp, even without first introducing into the cavity a separating intermediate layer of zinc phosphate cement or lacquer.

Of course, other lithium compounds than lithium phosphate may be added also to the phosphoric acid binding liquid, such as lithium oxide, hydroxide, carbonate, aluminate, and the like. The amount of the lithium compound added may also be varied. It may be greater or smaller according to the requirements of the dental filling material. The lithium compound can be dissolved in the phosphoric acid without heating the latter.

Hence, the most essential requirement of the present invention consists in producing dental fillings showing a content of lithium compounds which preferably is higher than 4 per cent calculated as lithium oxide. In accordance with this principle as set forth herein and in the claims annexed hereto many changes and variations may be made by those skilled in the art, and the invention is not to be limited except by the claims appended hereto.

What I claim is:—

1. A binding liquid for making dental fillings containing phosphoric acid, zinc phosphate, aluminum phosphate and a lithium compound.

2. A binding liquid for making dental fillings containing about 70–90 parts of phosphoric acid, 5–10 parts of zinc phosphate, 3–10 parts of aluminum phosphate, and 4–20 parts of lithium oxide in the form of a lithium compound.

EUGEN BRILL.